Figure 1:
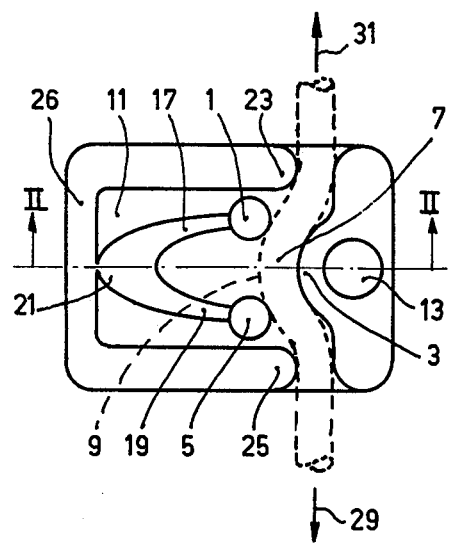

United States Patent [19]

Tillemans

[11] 4,162,561
[45] Jul. 31, 1979

[54] STRAIN-RELIEF DEVICE FOR A CABLE

[75] Inventor: Jacobus H. Tillemans, Eindhoven, Netherlands

[73] Assignee: U.S. Philips Corporation, New York, N.Y.

[21] Appl. No.: 852,069

[22] Filed: Nov. 16, 1977

[30] Foreign Application Priority Data

Jan. 5, 1977 [NL] Netherlands .................. 7700045

[51] Int. Cl.² ............................................. F16G 11/03
[52] U.S. Cl. .................... 24/129 R; 24/134 P; 24/115 R; 174/135; 174/175; 339/105
[58] Field of Search ............... 24/134 P, 134, 115 R, 24/115 H, 129 R; 403/215; 339/105; 174/175, 168, 135

[56] References Cited

U.S. PATENT DOCUMENTS

| | | | |
|---|---|---|---|
| 746,671 | 12/1903 | Carter | 24/134 P |
| 916,091 | 3/1909 | Batzer | 24/134 P |
| 1,149,385 | 8/1915 | Meyers | 24/134 P |
| 1,208,874 | 12/1916 | Wilson | 174/175 |
| 2,544,343 | 3/1951 | Miller | 339/105 |
| 3,897,161 | 7/1975 | Reinwall | 24/134 P |

FOREIGN PATENT DOCUMENTS 1536030  7/1968  France ..................... 174/175

*Primary Examiner*—Bernard A. Gelak
*Attorney, Agent, or Firm*—Thomas A. Briody; William J. Streeter; Bernard Franzblau

[57] ABSTRACT

A strain-relief device for a cable, having a clamping space for accommodating a cable portion bounded by three clamping members, the center clamping member being stationary and the two outer clamping members being disposed at the ends of two resilient movable arms. The clamping space thus automatically adapts itself to the cable thickness and insertion of the cable is particularly simple.

2 Claims, 3 Drawing Figures

U.S. Patent   Jul. 31, 1979   4,162,561

STRAIN-RELIEF DEVICE FOR A CABLE

The invention relates to a strain-relief device for a cable, having a clamping space which is bounded by three clamping members for accommodating a cable portion, when the cable portion is in the clamping space the first and the third of the three clamping members bear against one side of the cable portion near the beginning and the end of said portion respectively, and the second clamping member bears against the other side, near the middle of said portion, so that the cable portion is curved in the clamping space.

Such a device is for example used in electrical equipment such as radio and television receivers, so as to prevent the electrical connection between the power cord and the equipment from being mechanically loaded when the cord is pulled.

It is an object of the invention to provide a strain-relief device which is suitable for accommodating cables of different thickness and in which the cable can be inserted in a particularly simple manner. According to the invention the first and the third clamping members are located at the free ends of two arms which can move resiliently, in such a way that the clamping members are movable substantially parallel to the longitudinal direction of the cable portion.

Because of this construction the distance between the first and the second and that between the second and the third clamping member is automatically adapted to the thickness of the cable portion. When the cable is inserted the first and the third clamping member can readily be pressed aside, so that the cable portion can easily be pushed into the clamping space.

Figure 2:
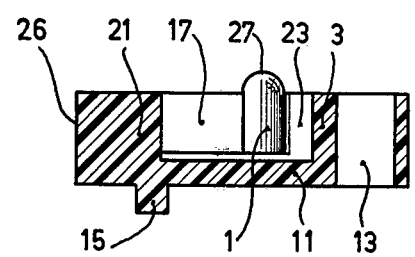
Figure 3:
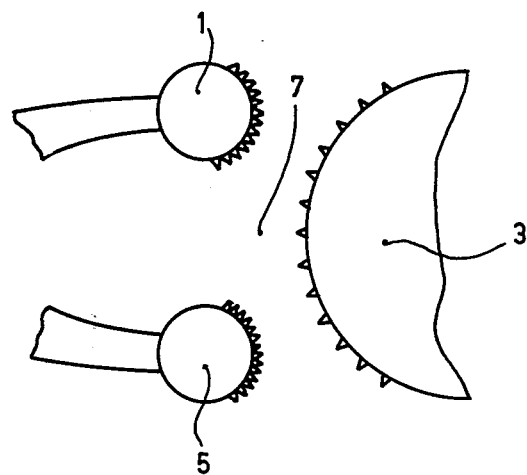

The invention will be described in more detail with reference to the drawing. In the drawing:

FIG. 1 is a plan view of an embodiment of a device in accordance with the invention, FIG. 2 is a cross-section taken on the line II—II in FIG. 1, and FIG. 3 is an enlarged plan view of the clamping members of the device shown in FIG. 1.

The strain-relief device shown in FIGS. 1 and 2 comprises three clamping members 1, 3 and 5 which enclose a clamping space 7 for accommodating a cable portion 9 (shown dashed). The first clamping member 1 and the third clamping member 5 bear against one side (the left-hand side in FIG. 1) of the cable portion 9 near the beginning and the end thereof, and the stationary second clamping member 3 bears against the other side (the right-hand side) substantially in the middle. The shape of the clamping space 7 has been chosen so that the cable portion 9 is curved in the clamping space.

The second clamping member 3 is rigidly connected to a frame plate 11, having an opening 13 and a boss 15 for mounting the device in the housing of electrical appliance. The first clamping member 1 is located at the free end of a first arm 17 and the third clamping member 5 is located at the free end of a second arm 19. The two arms 17 and 19 are secured to the frame plate 11 by a support 21, the arms and support forming a bifurcated part. They are made from a plastic with resilient properties, so that the clamping members 1 and 5 are movable substantially parallel to the longitudinal direction of the cable portion 9. This movement is limited towards the outside by stops 23 and 25 at the ends of a ridge 26. The surfaces of these stops moreover limit any lateral movements of the cable portions which project from the strain-relief device so that beyond the curved portion the cable extends in a longitudinal direction.

When the cable portion 9 is inserted the arms 17 and 19 are pushed outwards, so that the cable portion can readily be inserted into the clamping space 7 from the top. The arms 17, 19 are automatically pushed outwards when the cable portion 9 is inserted, in part because the top of each clamping member 1, 5 is rounded, as is shown in FIG. 2 near 27. Once the cable portion 9 is positioned in the clamping space 7, the arms 17, 19 resiliently bear against this cable portion, so that the transverse dimension of the clamping space is automatically adapted to the thickness of the cable portion.

When the cable is now pulled in the direction of the arrow 29, the cable portion 9 is thereby clamped more firmly between the clamping members 1 and 3, so that the tensile stress is taken up by these clamping members and is not transmitted to the electrical connections of the cable (not shown). When a force is exerted on the cable in the direction of the arrow 31, the cable portion 9 is clamped between the clamping members 3 and 5.

In order to prevent the cable portion 9 from slipping between the clamping members 1 and 3 in the case of a very great tensile stress in the direction of the arrow 29, the surfaces of the clamping members 1, 3, 5 facing the clamping space 7 are preferably knurled, as is shown on an enlarged scale in FIG. 3.

Preferably, as can be seen in FIG. 2, the entire strain-relief device is a unitary body integrally formed from a plastic, for example by injection-moulding. This is by far the cheapest method of manufacturing the device. If desired, the device may also be assembled from separate components. The arms 17, 19 may then for example be rigid and hinge about a pin fitted near 21. A separate spring then ensures that the clamping members 1 and 5 engage resiliently.

What is claimed is:

1. A strain-relief device for a cable, having a clamping space bounded by three clamping members for engaging a cable portion, the first and third members bearing on one side of the cable near the respective ends of the portion while the second member bears against the other side near the middle of said portion, said members being so disposed relative each other that said portion is curved, in the clamping space; and having a frame to which said clamping members are connected, wherein said frame has surfaces engaging the cable at locations spaced from said curved portion, said surfaces defining a longitudinal direction of the cable; said frame and said members are parts of a unitary body; and said first and third members respectively are formed by the ends of two arms arranged to be movable resiliently and substantially parallel to said longitudinal direction, while the second member is stationary relative to the frame.

2. A strain-relief device for a cable as in claim 1, wherein said arms form a bifurcated resilient part of a unitary molded plastic device.

* * * * *